United States Patent [19]

Moyer

[11] Patent Number: 5,439,637

[45] Date of Patent: Aug. 8, 1995

[54] DEBRAZING OF STRUCTURES WITH A POWDERED WICKING AGENT

[75] Inventor: Craig R. Moyer, Muncie, Ind.

[73] Assignee: Pyromet Group, Inc., Muncie, Ind.

[21] Appl. No.: 277,974

[22] Filed: Jul. 20, 1994

[51] Int. Cl.[6] .............................................. B22F 7/00
[52] U.S. Cl. ................................. 419/26; 419/2;
419/23; 419/28; 419/30; 419/56; 501/1
[58] Field of Search .................. 419/2, 23, 26, 28, 30, 419/56; 501/1

[56] References Cited

U.S. PATENT DOCUMENTS

| | | | |
|---|---|---|---|
| 4,101,691 | 7/1978 | Borchert | 427/229 |
| 4,274,908 | 6/1981 | Fishter et al. | 156/637 |
| 4,302,246 | 11/1981 | Brindisi, Jr. | 75/101 |
| 4,324,626 | 4/1982 | McGivern, Jr. | 204/146 |
| 5,040,718 | 8/1991 | Lee et al. | 228/119 |
| 5,167,720 | 12/1992 | Diamond et al. | 134/25.4 |
| 5,219,520 | 6/1993 | Brofman et al. | 419/35 |

Primary Examiner—Donald P. Walsh
Assistant Examiner—Scott T. Bluni
Attorney, Agent, or Firm—R. Steven Linne; Ice, Miller, Donadio & Ryan

[57] ABSTRACT

Brazed structures are disassembled with little or no physical damage to the components by coating the brazed joints with a powdered wicking agent, preferably mixed with a fugitive liquid binder to form an adherent slurry, then heating the joint to allow the brazing alloy to melt and be drawn into the powdered wicking agent by capillary action. After cooling, the powder and braze alloy are mixed together to form a loosely consolidated mass which can be readily removed by mechanical and/or chemical means so that the components can then be separated for repair or reuse.

14 Claims, 1 Drawing Sheet

DEBRAZING OF STRUCTURES WITH A POWDERED WICKING AGENT

FIELD OF THE INVENTION

This invention relates generally to a metallurgical process for disjoining a brazed structure without damage to its components and more specifically to a process using a powdered material to pull and absorb braze metal from a previously brazed joint by capillary attraction, or wicking, after coating the joint with powder and heating the joint to an elevated temperature.

BACKGROUND OF THE INVENTION

Many complex metal structures are assembled by brazing, a process of joining two metal surfaces by introducing a third metal, the brazing alloy or filler metal, between them at an elevated temperature. When the elevated temperature is relatively modest, e.g. below about 500° C., the process may be called soldering. Upon cooling, the two original surfaces, along with the filler alloy, are metallurgically bonded into a unitary structure. Often it would be very desirable to be able to reverse this process, i.e. remove the filler metal and allow the two component surfaces to be separated for repair or salvage. However, merely heating the structure again to the brazing temperature will not cause the filler alloy to simply flow out of the joint but instead may cause the bond to be strengthened by diffusion of the braze alloy into the components.

While the components may be made of almost any material, including ceramics, the components of most interest in this invention are made from nickel, cobalt, and iron based superalloys commonly used, for example, in the aerospace industry for gas turbine engine subassemblies. Such components are very expensive and worth salvaging for repair and reuse. Common brazing alloys used with these base metals include silver, copper, gold, and nickel based alloys.

One method currently used to separate brazed components is to soak them in a warm chemical bath until the braze alloy is chemically leached from the joint. However, such a process is often complex, very time consuming and the chemical media, which is often a strong acid, can cause damage to the components and/or the environment. See, for example U.S. Pat. No. 4,274,908 to Fishter at al which discloses a complex nitric acid solution for removing gold-nickel braze alloy from superalloy parts; U.S. Pat. No. 4,302,246 to Brindisi et al which discloses improved acid solutions; and U.S. Pat. No. 4,324,626 to McGivern which disclosed an electrolytically assisted acid leaching process.

It should be apparent from the foregoing that there has been a long felt need in this art for a more efficient process for disassembling a brazed structure without damage to its components.

SUMMARY OF THE INVENTION

It is therefore an object of the present invention to overcome some of the disadvantages of the prior art, as well as offer certain other advantages which should become apparent as this description proceeds, by providing a novel process for disassembling a brazed structure of the type having two or more components bonded by metallic braze alloy in a joint. The process basically comprises the steps of: a) applying powdered wicking agent along said joint; b) heating the joint to an elevated temperature sufficient to allow the braze alloy to be drawn out of the joint and into the powdered wicking agent by capillary action; c) cooling the joint to room temperature so that the wicking agent and braze alloy together form a loosely consolidated, porous mass adjacent to the joint; d) removing substantially all the mass from adjacent the joint by mechanical and/or chemical means; and then e) separating the components from one another for repair or reuse.

In addition, the invention includes a novel debrazing product in which the powdered wicking agent (which may be a metallic or ceramic particulate material of various sizes and shapes) is mixed with a liquified, organic binder to form a viscous slurry that can be uniformly applied along the length of a joint to be debrazed. Such binders should be fugitive, i.e. will decompose during the heating cycle and not interfere with the wicking action. Brazing fluxes may also be added to the slurry, to promote the wetting of the powder by the braze alloy, as is known in the art. Chemically reducing or inert cover gases or a vacuum atmosphere may be employed during furnace heating to prevent powder oxidation and/or also promote powder wetting. It is also preferable that the debrazing temperature not be substantially higher than the original brazing temperature so that the metallurgical structure of the components is not adversely affected.

BRIEF DESCRIPTION OF THE DRAWINGS

While this specification concludes with claims particularly pointing out and distinctly claiming the subject matter which is now regarded as the invention, it is believed that several of the features and advantages thereof may be better understood from the following detailed description of a presently preferred embodiment when taken in connection with the accompanying drawings in which:

DETAILED DESCRIPTION OF THE INVENTION

Figure 1:
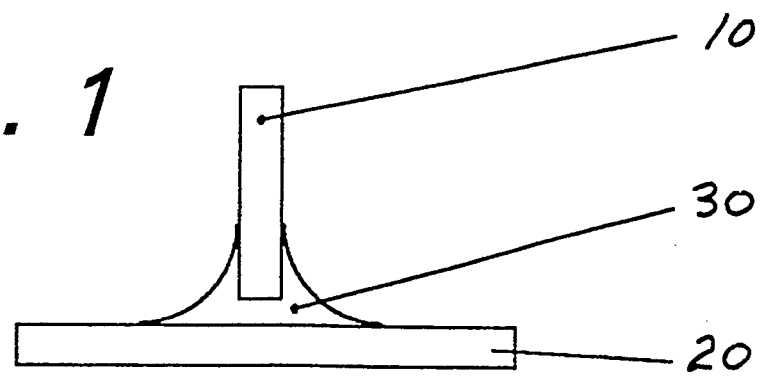
FIG. 1 is a representation, not to scale, of a typical brazed joint between two components which may be part of a larger structure.
Figure 2:
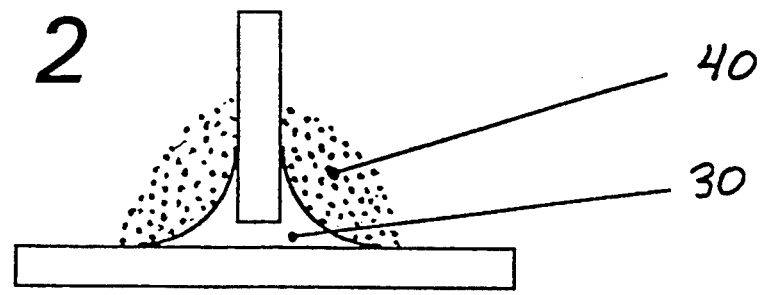
FIG. 2 is a representation of the joint overlaid with powdered wicking agent.

As illustrated in FIG. 1, a typical brazed joint comprises a first component, 10, and a second component, 20, with a mass of braze alloy, 30, solidified therebetween to firmly bond the individual components into a unitary structure. When it is desired to disassemble the structure, the braze alloy, 30, is overlaid, as illustrated in FIG. 2, with a powdered wicking agent, 40. While the wicking agent, 40, may be any particulate material having a higher melting temperature than, and is wetable by, the braze alloy, 30, it is advantageous to use a fine (less than about 150 mesh) metal powder. Powders of various sizes, less than about 50 mesh, and shapes, including flattened flakes and elongated fibers, have been successfully tested. Most preferably, slightly flattened metallic powders are used. Such powders of aluminum, cobalt, copper, iron, nickel, and their alloys are readily available. In order for the agent, 40, to adhere to convoluted joint shapes, it is advantageous to mix the particulate matter with a medium viscosity liquid binder to form a debrazing slurry. Such binders are well known in the art for use with brazing powders and decompose at elevated temperatures so as not to interfere with the wicking action. Preferably, the volume of slurry (which itself preferably contains from 50 to 95 volume percent wicking agent, 40) to be used is approximately 2 to 3 times the volume of braze alloy, 30, present in order to provide enough unconsolidated wicking agent (raw powder) to establish an excess of braze alloy absorption capability. When the wicking agent is elongated metallic fibers rather than spherical powders, the volume fraction may be as low as about 15-20% in the slurry and still give good results. It is believed that the greater pore to solid volume ratio provides more effective wicking action. It may be advantageous to use a dispensing device, such as a caulking gun, to uniformly apply the slurry along convoluted or lengthy joints.

Figure 3:
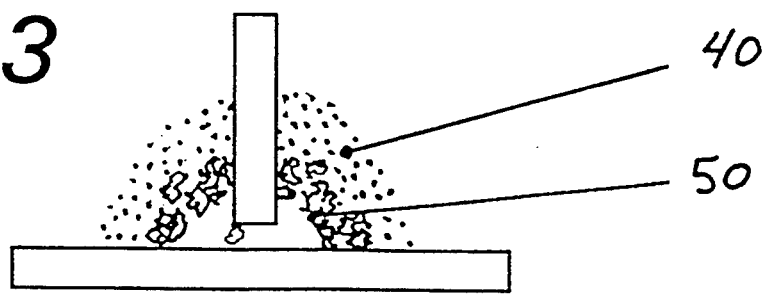
FIG. 3 is a representation of the joint after a debrazing heating and cooling cycle.

Once the brazed joint is overlaid with the wicking agent or slurry, it is heated for debrazing which may be by the same type of equipment used for brazing, such as manual oxyacetylene or plasma torches, radiation, resistance or induction heaters, or in a vacuum or gas atmosphere furnace all as is well known in the art. After heating the overlaid joint to a sufficiently high temperature, the braze alloy becomes fluid and all or most is drawn by capillary action out of the joint and into the small pores formed in the adjacent wicking agent, 40. After cooling as illustrated in FIG. 3, the again solidified braze alloy and some of the wicking agent (powder) mix together to form a loosely consolidated, porous mass, 50, adjacent the joint.

This porous mass, 50, is easily removed, for example by light grinding, blasting with grit or water under high pressure (as disclosed in U.S. Pat. No. 5,167,720) or soaking in a chemical stripping bath, so that the individual components, 10 and 20, can be separated for repair or reuse. The porous nature of the mass allows the chemical stripping media rapid access to a large amount of surface area of the braze alloy to be removed, thereby accelerating the process.

EXAMPLES

A gas turbine stator assembly was cleaned and prepared for debrazing by overlaying all brazed joints with a slurry of slightly flattened iron powder (e.g. mesh fraction minus 150, plus 325) and a water soluble binder (e.g. Nicrobraz 650). The volume ratio of slurry to braze alloy was at least three to one to ensure an excess of wicking agent. After air drying for a short time, the assembly was loaded into a vacuum furnace (with sufficient support tooling to prevent distortion) and heated to a sufficient temperature to melt the braze alloy. That is, for assemblies brazed with AMS 4787 (a gold base alloy), heat to 1850° F.; for AMS 4777 (a nickel base alloy), heat to 1910° to 1950° F.; for PWA 996 (another nickel base alloy), heat to 2040° to 2060° F. The proper temperature for other braze alloys may easily be determined by those skilled in this art. The parts were held at temperature for about 25 to 30 minutes, long enough for the braze alloy to be drawn out of the joint by the wicking agent. After cooling, the assembly was inspected for complete coverage of all brazed joints by the wicking agent. If some areas have been missed, the procedure could be repeated. However, depending upon the specific materials involved, it is preferable to limit the number of repeats to no more than two to avoid any undesirable changes in the metallurgical microstructure of the components.

After the debrazing cycle, some of the wicking agent was combined with the braze alloy to form a loosely consolidated, porous mass adjacent the joint. This mass was easily removed by soaking the assembly in a warm (about 140+/−15° F.) nitric acid based stripping solution for about 10 hours allowing the components to be separated without damage. Occasionally, some assemblies contain a few small tack welds originally used to position the components for brazing. Any welds still remaining after the acid bath may be removed by light grinding.

While the present invention has been described in terms more or less specific to one preferred embodiment, it is expected that various alterations, modifications, or permutations thereof will be readily apparent to those skilled in the art. Therefore, it should be understood that the invention is not to be limited to the specific features shown or described, but it is intended that all equivalents be embraced within the spirit and scope of the invention as defined by the appended claims.

What is claimed is:

1. A process for disassembling a brazed structure, of the type having two or more components bonded by metallic braze alloy in a joint, comprising the steps of:
   a) applying a viscous slurry, comprising a powdered wicking agent and a liquid binder, to uniformly overlay said joint, said wicking agent being a powder having a melting temperature higher than that of said braze alloy and being wetable by said braze alloy when said joint is heated above the melting temperature of said braze alloy;
   b) heating the joint overlaid with said slurry to an elevated temperature sufficient to allow the braze alloy to flow out of the joint and into the powdered wicking agent;
   c) cooling the joint to room temperature so that the wicking agent and braze alloy solidify together to form a loosely consolidated mass adjacent the joint;
   d) removing substantially all said consolidated mass from adjacent the joint; and
   e) separating the components from one another.

2. The process of claim 1 wherein said powder is selected from the group consisting of: cobalt, copper, iron, nickel and alloys or mixtures thereof.

3. The process of claim 2 wherein the size of said powder is minus 150, plus 325 mesh.

4. The process of claim 1 wherein the powder is a powdered ceramic material.

5. The process of claim 1 wherein said slurry contains 50 to 95 volume percent wicking agent and is applied along the joint in a ratio of at least about three parts by volume slurry for each part by volume braze alloy.

6. The process of claim 1 wherein step b) includes heating the joint less than three times to a temperature near the melting temperature of said braze alloy.

7. The process of claim 1 wherein step b) is performed in a vacuum furnace.

8. The process of claim 1 wherein step b) is performed in a gas atmosphere furnace.

9. The process of claim 1 wherein step d) is accomplished by grinding said mass from said joint.

10. The process of claim 1 wherein step d) is accomplished by grit blasting said mass from said joint.

11. The process of claim 1 wherein step d) is accomplished by blasting said mass from said joint with a high pressure water spray.

12. The process of claim 1 wherein step d) is accomplished by soaking said joint in a chemical stripping bath.

13. The process of claim 12 wherein said chemical stripping bath comprises a warm nitric acid solution.

14. The process of claim 2 wherein the metal powders are in the form of flattened flakes.

\* \* \* \* \*

UNITED STATES PATENT AND TRADEMARK OFFICE
CERTIFICATE OF CORRECTION

PATENT NO. : 5,439,637
DATED : August 8, 1995
INVENTOR(S) : Craig R. Moyer

It is certified that error appears in the above-identified patent and that said Letters Patent is hereby corrected as shown below:

Column 4, line 65, delete "warm".

Signed and Sealed this

Twelfth Day of December, 1995

Attest:

BRUCE LEHMAN

Attesting Officer       Commissioner of Patents and Trademarks